Oct. 10, 1939.   C. PLEUTHNER   2,175,483
GASOLINE DISPENSER
Filed June 29, 1937
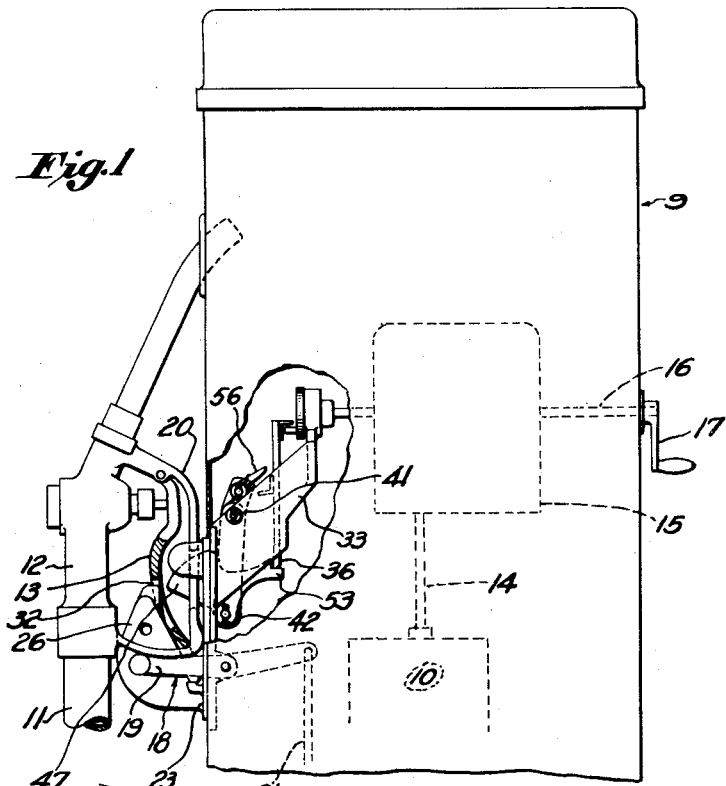
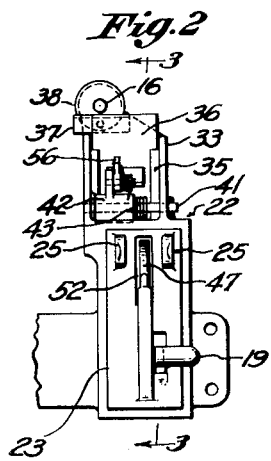
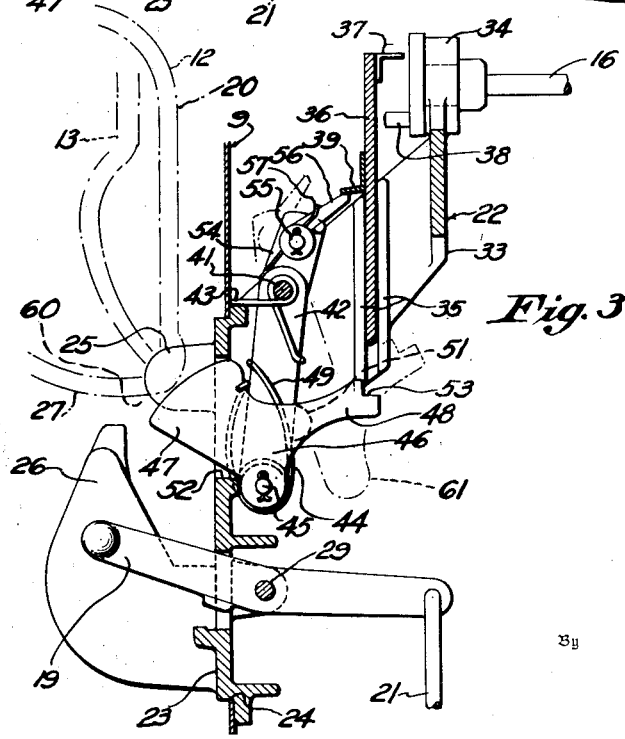
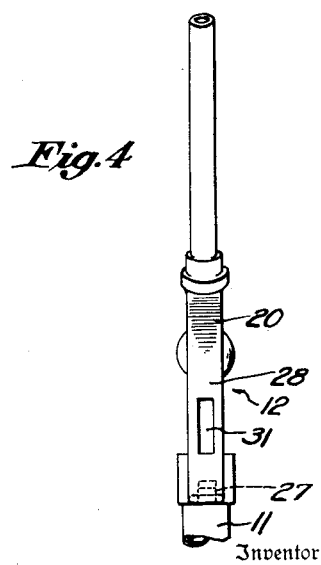
Inventor
Charles Pleuthner
Albert R. Henry
Attorney Patented Oct. 10, 1939

2,175,483

UNITED STATES PATENT OFFICE 2,175,483

GASOLINE DISPENSER

Charles Pleuthner, Buffalo, N. Y., assignor to Martin & Schwartz, Inc., Buffalo, N. Y.

Application June 29, 1937, Serial No. 150,975

3 Claims. (Cl. 221—95)

This invention relates to gasoline dispensers, and it has particular reference to the provision of means for inducing the resetting of the register thereof to a zero position, after each dispensing operation.

In the customary type of dispenser, there is provided a flow meter, which discharges into a dispensing hose having a nozzle adapted to be supported on a hook when the apparatus is not in use. The movement of the meter is reflected in a registering mechanism, so that, after the dispensing operation, the volume of liquid dispensed may be readily ascertained. Inasmuch as the register should be at a zero position before each dispensing operation, it is desirable to provide means inducing the operator to reset the dials, upon the completion of any operation, or before the institution of a subsequent one.

The present invention has, as its major object, the provision of novel means inducing the operator to reset the dials of the register, and this object is achieved by providing an automatic locking device securing the hose nozzle to its supporting hook until the reset mechanism is operated to restore the dials to a zero position. Another object of the invention is to provide a locking device of simple nature, to the end that it may be employed without undue expense, and will be relatively free from service difficulties. Other objects will appear as the following description proceeds, while the novel features of the invention will be set forth in the appended claims.

A typical embodiment of the invention is shown in the accompanying drawing, wherein:

Fig. 1 is a fragmentary view of a gasoline dispenser with a portion of the housing broken away to show the locking structure. The locking device is shown in locked position;

Fig. 2 is a front view of the locking device;

Fig. 3 is an enlarged section on the line 3—3 of Fig. 2 with the mechanism shown in unlocked position;

Fig. 4 is a front view of the dispensing nozzle.

In Fig. 1, the invention is shown applied to a gasoline dispenser housing 9, the instrumentalities of which, being well known in the art, will be but briefly described. The housing contains a fluid driven meter 10 which receives gasoline from a suitable supply source (not shown) and delivers it to a dispensing hose 11 having a valved nozzle 12. A lever 13 on the nozzle is operable to open or close the valve in the nozzle. During a dispensing operation, the meter, through a connecting shaft 14, operates a register 15 which visibly indicates the quantity of gasoline dispensed.

After the dispensing operation, the mechanism of the register 15 may be restored to a zero setting by turning a set-back shaft 16 by means of an attached handle 17. The liquid supply to the meter may be discontinued at the will of the operator through the operation of a pivoted lever 18, one end 19 of which protrudes from the housing and is depressible (Fig. 1) to raise a rod 21 secured to the inner end thereof. The rod may lead to a suitable control, such as a switch or valve for controlling the fluid circuit.

The locking device consists of a fixture 22 having a panel 23, which is mounted in an aperture 24 in the dispenser housing 9. The panel 23 is formed with protruding portions which serve as a support for the nozzle 12 when the nozzle is not in use. These portions consist of a pair of projecting lugs 25 between which the lever guard 20 of the nozzle is received, and a projecting hook member 26 which engages through the slotted lower portion 27 of the guard. When the nozzle is thus mounted, the portion 27 of the guard engages and depresses the end 19 of the control lever 18, which is pivotally mounted on the bracket as indicated by the numeral 29.

The guard 20 is formed with an additional slot 31 in its side portion 28 (Fig. 4) while the valve actuating lever 13 is slotted as indicated by the numeral 32 to receive the tip portion of the hook member 26.

In the interior of the housing, the fixture 22 is formed with a hollow bracket 33, on the upper extremity of which is formed a horizontal bearing 34 for receiving the end of the set-back shaft 16. In close proximity to the bearing 34, opposed vertical slides 35 are formed in the bracket 33 for slidably receiving a locking plate 36. An angle 37 is secured to the outer face of the plate 36, and it is adapted to be engaged by a crank 38 secured to the shaft 16. A second angle 39 is secured to the opposite face of the plate.

A stud 41 is transversely mounted in the bracket 33, and a lever 42 is rotatably mounted thereon. A strong torsion spring 43 continually urges the lower arm 44 of the lever toward the panel 23. A stud 45 is carried by the arm 44, and it rotatably receives a locking lever 46 having oppositely extending pawl and latch portions 47 and 48. A light torsion spring 49 having its ends fixed to the lever 42 and pawl portion 47 respectively tends to move the locking lever 46 counterclockwise to a position limited by the engagement of a stop lug 51 thereon with the lever 42. The pawl portion 47 normally extends through a slot 52 in the panel 23, while the latch portion is disposed with its terminal tooth 53 immediately under the locking plate 36.

The upper arm 54 of the lever 42 carries a stud 55 on which a pawl 56 is rotatably mounted. A spring 57 retains the pawl in contact with a stop portion formed on the extremity of the arm 54.

In Fig. 1 the nozzle is shown locked against upward removal from the hook 26 by the pawl portion 47, which projects through the slot 31 of the nozzle guard 20. Pivotal movement of the pawl lever 46 about its pivot stud 45, as well as swinging movement of the carrying lever 42 about its stud 41, is prevented by the engagement of the locking plate 36 with the tooth 53 of the latch portion 48 of the lever 46.

To free the nozzle it is necessary to restore the register elements to a zero reading by operating the set-back shaft 16, during which operation the crank 38 thereof engages the angle 37 of the locking plate 36 and thus lifts the plate out of locking engagement with the lever 46. As the plate is raised, its angle 39 passes the pawl 56 which snaps into position beneath the angle to retain the plate in its elevated position. The nozzle may then be freely lifted from the hook 26, during which lifting movement the lever 46 is rotated on its axis against the urge of its spring 49. The lever 42 is undisturbed during this operation, since its spring 43 is sufficiently strong to resist the added load applied to the spring 49.

During the succeeding dispensing operation, the set-back shaft 16 is rotated by the registering mechanism so that its crank no longer supports the plate 36, but transmits the load of the elevated plate to the pawl 56 (Fig. 3).

During the operation of replacing the nozzle on the hook, the hilt of the guard engages the arcuate surface 40 of the pawl portion 47 (dotted lines 60, Fig. 3) and swings the entire lever system about the stud 41 to the dotted position indicated by the numeral 61. The pawl 56, being swung out of supporting position, thus releases the plate 36, which drops upon the pawl portion 47 of the lever 46 and ultimately enters the tooth 53 thereof, whereupon the nozzle is again locked, as shown in Fig. 1.

It will be observed that the lock not only prevents removal of the nozzle, but effectively prevents independent movement of both the valve lever 13 and the control lever 18.

While the invention has been described with respect to one embodiment, it will, of course, be understood that the same is susceptible to modification without departure from the scope thereof, as defined by the following claims.

I claim:

1. In a dispenser, a housing, a liquid flow registering device including a set-back mechanism, a delivery nozzle, a support for the nozzle located on the exterior of the housing, an arm pivotally mounted within the housing, a pawl member pivotally secured to the extremity of the arm and having a portion extending through the housing into a position obstructing removal of the nozzle from the support, said pawl being freely rotatable on said arm in one direction of movement to permit removal of said nozzle from the support, and being formed with a stop member engaging said arm to limit excessive rotation in the opposite direction, whereby upon restoring the nozzle to the support, the pawl and arm are swung together, means operated by the set-back mechanism for locking the pawl, and means controlled by movement of said arm for rendering said last named means operative.

2. In a dispenser, a housing, a liquid flow registering device including a set-back mechanism, a delivery nozzle, a support for the nozzle located on the exterior of the housing, a member movably mounted within the housing, a pawl rotatably mounted on said member and projecting through the housing to a position obstructing removal of the nozzle from said support, said pawl being freely rotatable on said member in one direction of movement to permit removal of the nozzle from the support, said pawl being formed with a stop portion engaging said member to limit excessive rotation in the opposite direction, whereby upon restoring the nozzle to the support the pawl is engaged and the pawl and member are moved together, means operated by the set-back mechanism for locking the pawl against movement, and means controlled by movement of said member for rendering said last named means operative.

3. In a dispenser, a liquid flow registering device including a set-back mechanism, a delivery nozzle having a guard formed with a pair of slotted portions, a supporting hook adapted to receive one of the slotted portions of said guard, a member movably mounted within the housing, a pawl rotatably mounted on said member and projecting through said housing and the remaining slotted portion of said guard, said pawl being freely rotatable on said member in one direction of movement to permit removal of the nozzle from the support, said pawl being formed with a stop portion engaging said member to limit excessive rotation in the opposite direction, whereby upon restoring the nozzle to the supporting hook the pawl is engaged and said pawl and member are moved together, means operated by the set-back mechanism for locking the pawl against movement, and means controlled by movement of said member for rendering said last named means operative.

CHARLES PLEUTHNER.